United States Patent
Vandervelde

[15] 3,685,138
[45] Aug. 22, 1972

[54] METHOD OF AND APPARATUS FOR REMOVING IRREGULARITIES IN WELDED SEAMS

[72] Inventor: Robert J. Vandervelde, Oak Lawn, Ill.

[73] Assignee: Continental Can Company, Inc., New York, N.Y.

[22] Filed: Dec. 24, 1969

[21] Appl. No.: 887,869

[52] U.S. Cl. ..........................29/477, 29/480, 29/487
[51] Int. Cl. .............................................B23k 31/02
[58] Field of Search ...29/477, 480, 475, 487; 72/393

[56] References Cited

UNITED STATES PATENTS

| | | | |
|---|---|---|---|
| 756,832 | 4/1904 | Cleveland | 29/480 X |
| 1,628,928 | 5/1927 | Taylor | 29/477 |
| 2,767,740 | 10/1956 | Fentress | 29/480 X |
| 2,883,744 | 4/1959 | Barnhart | 29/480 X |
| 3,552,629 | 1/1971 | Ambruster et al. | 228/15 X |
| 1,095,014 | 4/1914 | Mauck et al. | 72/370 X |

Primary Examiner—John F. Campbell
Assistant Examiner—Richard Bernard Lazarus
Attorney—Diller, Brown, Ramil & Holt

[57] ABSTRACT

This disclosure relates to the removal or irregularities, such as ripples, in welded seams. An expandable mandrel is provided for insertion within a cylindrical member having a welded seam and the mandrel is expanded so as to circumferentially tension the metal of the container body sufficiently to remove the irregularities and to effect permanent deformation of the container body. In the removal of the irregularities, the container body is sufficiently permanently expanded so as to effect a sizing of the container body.

6 Claims, 5 Drawing Figures

PATENTED AUG 22 1972 3,685,138
FIG.1
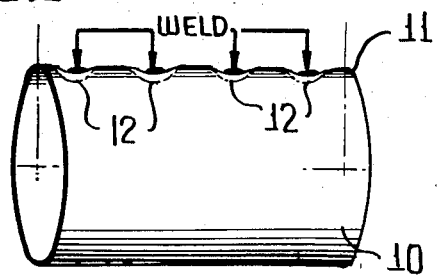
FIG.2
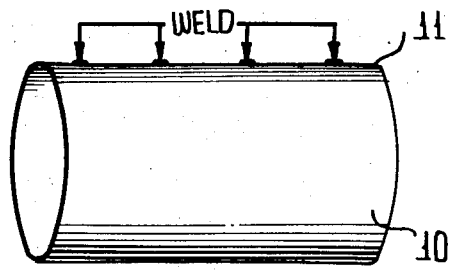
FIG.3
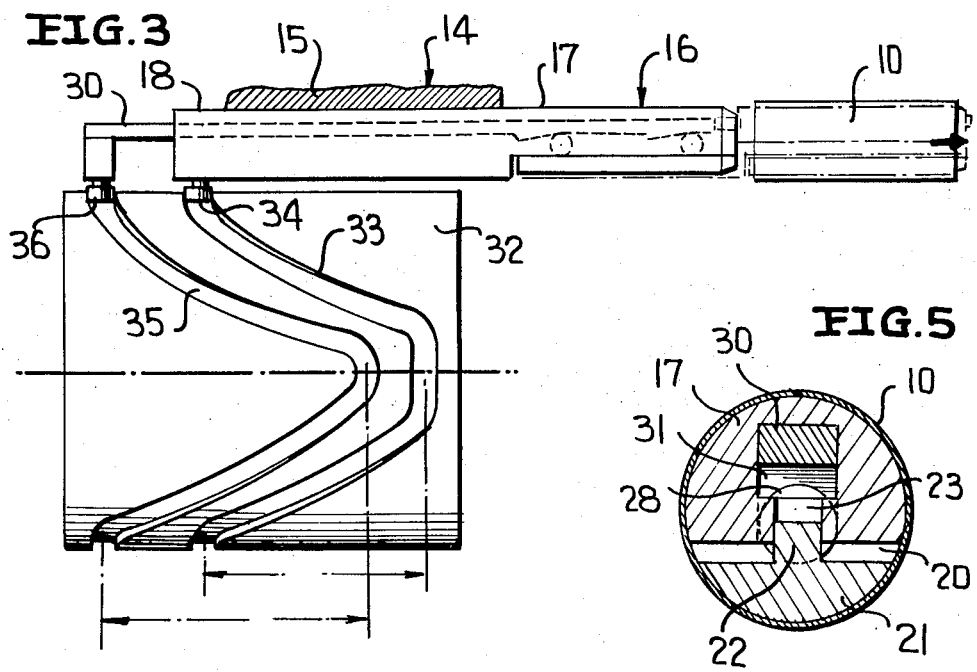
FIG.5
FIG.4
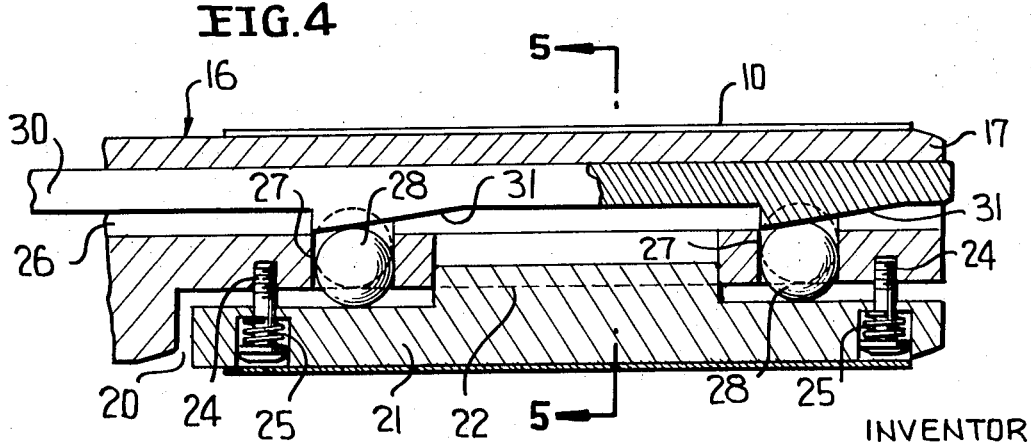
INVENTOR
ROBERT J. VANDERVELDE
Diller, Brown, Ramik & Holt
ATTORNEYS

METHOD OF AND APPARATUS FOR REMOVING IRREGULARITIES IN WELDED SEAMS

This invention relates in general to new and useful improvements in the formation of welded side seam container bodies, and more particularly to the provision of a method of and means for removing irregularities in the side seams of container bodies.

When the side seam of a relatively thin sheet metal container body is formed by a welding process, to the differential in expansions, the side seam has certain irregularities which detract from the appearance of the container body. This is particularly true when the container body is formed from a flat blank and rolled into a cylindrical form, followed by a temporary tacking together of overlapping edge portions of the blank, and thereafter the formation of a continuous welded side seam. Although in the formation of the continuous welded side seam welding covers the tack welds, the track welds still result in pronounced ripples along the welded seam, which ripples are undesirable.

In accordance with this invention, it is a primary object to iron out the irregularities which appear in welded side seams.

In accordance with this invention, it has been found that if a container body is circumferentially stressed, as by expanding the same, ripples and other irregularities which may appear along a welded seam disappear. It has been further found that if the container body is sufficiently tensilely stressed so as to effect permanent deformation thereof, the irregularities, including ripples resulting from tack welds, will permanently disappear.

As a result of the foregoing, it is a further object of this invention to remove the irregularities in welded side seams of container bodies by expanding the container bodies under controlled conditions to the extent that the container bodies are tensilely stressed sufficiently to remove the irregularities and effect a permanent deformation of the container bodies so that the irregularities do not again appear.

In accordance with this invention, it is also proposed to provide for a controlled expanding of the container body whereby in the same operation wherein irregularities are removed, the container bodies are sized.

Still another object of this invention is to provide suitable apparatus for automatically expanding of container bodies in accordance with the foregoing, the apparatus including an expandable mandrel, means for reciprocating the mandrels into and out of container bodies, and further means for effecting the actuation of the mandrel to expand within the container bodies so as to effect the desired expanding of the container bodies in accordance with this invention.

With the above and other objects in view that will hereinafter appear, the nature of the invention will be more clearly understood by reference to the following detailed description, the appended claimed subject matter and the several views illustrated in the accompanying drawing.

In the drawing:

FIG. 1 is a side perspective view of a welded seam container body showing the ripples which appear along the welded seam thereof.

FIG. 2 is a side perspective view of the container body in FIG. 1 after it has been worked upon in accordance with this invention.

FIG. 3 is a schematic elevational view of a typical mechanism in accordance with this invention.

FIG. 4 is an enlarged fragmentary vertical sectional view taken through the expandable mandrel of the apparatus of FIG. 3 and shows the specific constructional details thereof and the relationship to a container body.

FIG. 5 is a transverse vertical sectional view taken along the line 5—5 and shows further the details of the expandable mandrel.

Reference is now made to FIG. 1 wherein there is illustrated a typical container body 10 having a welded side seam 11. While it is to be recognized that the container bodies may be of different sizes, a typical container body would be a can body, such as that utilized in beer and soft drink cans. The container body 10 may be formed of a relatively thin metal, such as metal having a thickness on the order of 0.008 inch. The container body 10 is formed in a manner which is not part of this invention. However, it is to be understood that it is formed from a flat sheet metal blank which is rolled into a tubular configuration with the side edges thereof in overlapping relation. In order that the tubular configuration of the rolled blank may be maintained, the overlapped side edges are tack welded together at a series of points, as indicated in FIG. 1. Thereafter, the tack welded together container body is passed through a suitable welding apparatus and a continuously welded side seam is formed, this side seam being the side seam 11.

Although the side seam 11 has the desired strength characteristics, it is provided with irregularities throughout the length thereof due to tack welding. Also, due to thermal expansion differences the side seam 11 may have other irregularities. The ripples are identified by the numeral 12 in FIG. 1. It is to be understood that these ripples will have an amplitude varied from 0.014 to 0.028 inch deep in the average container body of the size specifically set forth above. These ripples clearly detract from the appearance of the container body.

In accordance with this invention, it has been found that if an expanding mandrel is placed within the container body of FIG. 1, and the mandrel actuated so as to circumferentially stress the container body 10, the ripples 12 may be permanently removed. In order to accomplish this, it is necessary to tensilely stress the container body 10 sufficiently so as to effect a permanent deformation thereof. It has been found that with a container body having a diameter on the order of 2 9/16 inches, the diameter should be increased on the order of 0.002 inch. This does not unduly stress the metal of the container body so as to weaken the same, and at the same time assures the removal of the wrinkles 12 or other irregularities in the container body.

It is also pointed out here that by initially forming the container body 10 slightly undersize and then expanding the same so as to increase the diameter thereof approximately 0.002 inch, the expanding mandrel can further be utilized to automatically size the container body as it removes the irregularities therefrom.

It is to be understood that in the formation of the welded side seam 11, the container bodies are moved along a horn. Such a horn (not shown) may have incorporated therein an expanding mandrel. However, in order to expand the container bodies in accordance with this invention, it is necessary that the container bodies be stopped during the expanding thereof and difficulties have been experienced in attempting to expand the container bodies at the same rate the welded side seams 11 can be formed.

A further alternative is to provide a separate machine for expanding the container bodies to remove irregularities therein in accordance with this invention. Such a machine preferably would be of the turret type and includes a plurality of expanding mandrels. Portions of such a machine are schematically illustrated in FIGS. 3 through 5.

A typical machine in accordance with this invention, such machine being identified generally by the numeral 14, would include a turret 15 which is mounted for rotation about a fixed axis in any desired manner. The turret 15 would have suitably mounted therein for controlled reciprocation between a retracted position and a projected position within a container body, a plurality of expanding mandrels generally referred to by the numeral 16. Each mandrel 16 would have a forward portion 17 adapted to be received within a container body, and a rear portion 18 which is suitably mounted for reciprocatory movement relative to the turret 15.

The forward portion of the mandrel 16, as is shown in FIGS. 5 and 6, would have a T-shaped portion thereof removed to define a recess 20. The recess 20 would have seated therein an expander cheek 21 which has a central projecting portion 22 which projects radially into a stem portion 23 of the recess 20. Thus, the cheek 21 will be mounted for guided radial movement only.

The expander cheek 21 is removably secured to the forward portion 17 of the mandrel 16 by means of a pair of fasteners 24 which carry springs 25 reacting inwardly against the expander cheek 21 to always urge the expander cheek 21 to a retracted position within the recess 20.

The mandrel 16 has an axially extending opening 26. At least two radial openings 27 extend between the opening 26 and the recess 20 in alignment with the expander cheek 21. In each of the openings 27 there is positioned a rolling type element, preferably in the form of a ball 28.

The mandrel 16 has mounted in the opening 26 for relative reciprocating movement an expander rod 30. The expander rod 30 is provided with a pair of longitudinally spaced ramps 31, there being a ramp 31 generally aligned with each of the openings 27 and engageable with the balls 28 disposed in the openings 27.

In FIG. 4, the mandrel 16 is illustrated in an expanded position. In this position of the mandrel 16, the expander rod 30 has moved to the right with the ramps 31 engaging the balls 28 and moving the balls radially towards the expander cheek 21. The balls 28, in turn, have moved the expanded cheek 21 radially against the resistance of the springs 25. It will be readily apparent that when the forward portion 17 of the mandrel 16 is disposed within a container body or other tubular member, and there is controlled movement of the expander rod 30 relative to the mandrel 16, the expander cheek 21 will serve to expand and circumferentially tensilely stress the container body to the desired and necessary extent as explained above.

Referring once again to FIG. 3, it will be seen that the machine 14 also includes a cam member 32 which is fixed, and which, although it is illustrated as being of a one-piece construction, may be sectional. The cam member 32 has a first cam track 33 formed therein in which a cam follower 34 carried by the mandrel 16 is engaged. It will be seen that as the turret 15 rotates and the mandrel 16 moves about the cam member 32, reciprocation of the mandrel 16 automatically occurs.

The cam member 32 is provided with a second cam track 35 in which a cam follower 36 is positioned. The cam follower 36 is carried by the expander rod 30 and serves to effect reciprocation of the expander rod 30 as the expander rod 30 moves about the cam member 32 with the turret 13.

It is to be noted that the cam tracks 33 and 35 are so correlated whereby the expander rod 30 moves in unison with the mandrel 16 as the mandrel 16 is being projected and retracted. However, once the mandrel 16 has been fully projected to a position wherein it will be disposed within a container body 10 to be expanded, further rotation of the turret 15 will reside in further movement of the expander rod 30 with such movement being relative to the mandrel 16 so as to effect the radial wedging of the expander cheek 21 in the manner previously descrrbed and illustrated in FIGS. 4 and 5.

It will be readily apparent that the container bodies 10 may be suitably supported by other turret structure (not shown) which move the container bodies 10 in unison with the turret 15 and which will serve to loosely hold the container bodies during the expanding thereof.

After the container body 10 has been expanded, the irregularities therein, particularly the irregularities along the side seam 11, will be removed and the container body 10 will have a pleasing appearance, including along the welded side seam 11, as is clearly shown in FIG. 2.

Although only a preferred embodiment of the invention has been specifically illustrated and described here, it is to be understood that minor variations may be made both in the method and the apparatus without departing from the spirit and scope of the invention, as defined by the appended claims.

I claim:

1. In the method of forming welded side seam metal can bodies wherein the side seam is formed by first bringing together edge portions of a can body blank having a thickness on the order of 0.008 inch into overlapping relation and then tack welding together the overlapped edges at longitudinally spaced points, and thereafter continuously welding together the overlapped edges by the application of heat and pressure whereby undesired ripples are formed generally along the welded area, the further step of removing ripples occurring generally along the side seam by tensioning the metal of the can body along the side seam sufficiently to remove the ripples.

2. The method of claim 1 wherein the tensioning of the metal of the side seam is to a degree to effect permanent deformation thereof.

3. The method of claim 1 wherein the tensioning is circumferential.

4. The method of claim 1 wherein the tensioning is circumferential and the entire can body is stressed.

5. The method of claim 1 wherein the tensioning is circumferential and the entire can body is stressed by expanding the can body.

6. The method of claim 5 wherein the expanding of the can body is to a degree wherein there is permanent deformation of the can body and the can body is sized during the expanding thereof.

* * * * *